MECHANISM TO SELECTIVELY INSERT SINGLE DIGITS OR A PLURALITY OF THE SAME DIGITS INTO A CALCULATOR REGISTER

Filed June 13, 1963

INVENTORS.
BAROZZI GIAMPIERO
HORESCHI GIANCARLO

BY A. J. De Angelis

ATTORNEY

United States Patent Office 3,155,315
Patented Nov. 3, 1964

3,155,315
MECHANISM TO SELECTIVELY INSERT SINGLE DIGITS OR A PLURALITY OF THE SAME DIGITS INTO A CALCULATOR REGISTER

Giam Piero Barozzi and Gian Carlo Horeschi, Cremona, Italy, assignors to Sperry Rand Corporation, New York, N.Y., a corporation of Delaware Filed June 13, 1963, Ser. No. 287,654
4 Claims. (Cl. 235—60)

The present invention relates to calculating machines and the like, and more particularly to keyboard and registering mechanisms for registering various digits into such machines.

Many calculating machines have been designed featuring a ten key keyboard. In the usual ten key arrangement, there are provided individually actuatable keys for the digits 1–9 and a single depressable bar for zero "0." Numbers are placed into the register of such machines through depression of selected digit keys and the zero bar, which depressions actuate corresponding settable stop pins mounted in rows in an indexing pin box. In registering a given number, a selected digit key or the zero bar is pressed, causing depression or "setting" of a corresponding pin in a first row of the pin box. The pin box is then indexed one step, placing the next succeeding pin row in position to register the next succeeding digit of the number. This process continues until all digits of the number have been registered in step-by-step fashion.

It is sometimes desirable to provide keyboard and registering mechanisms capable of selectively registering a given digit singly or in multiples. For example, recently machines have been provided, which in addition to the usual digit keys 1–9, have featured three separate zero keys. Upon depressing the first of these zero keys, a single zero will be "set" into the machine register. By pressing the second of these zero keys, two zeros will simultaneously be placed into the register. Depression of the third zero key results in placing three zeros simultaneously into the machine register. With such single, double or triple zero setting mechanisms, depending upon which zero key is depressed, the pin box correspondingly must be indexed either 1, 2 or 3 steps to register correctly the numeral input to the machine.

In the prior art, various mechanisms have been devised for accomplishing the foregoing desired result. In some of these mechanisms, special extra wide zero stop pins are used, which are not interchangeable with other digit pins. This undesirably complicates manufacturing operations and necessitates the stocking of two types of pins. Also in prior mechanisms may be found systems for indexing the pin box which use an extra row of special pins, as indexing pins. In such indexing mechanisms arranged for selective registration of a given digit singly or in multiples, as for example, single or multiple zero registration, the indexing pins are variously coupled to the zero stop pins. Such coupling undesirably increases the complexity of the machine and adds to its manufacturing cost.

It is, therefore, an object of the invention to provide improved keyboard and registering mechanism of simple construction and reliable operation.

Another object is to provide keyboard and registering mechanism in which the digit stop pins function as indexing pins in addition to their usual function as stop pins.

A further object is to provide such mechanism for selectively registering a selected digit singly or in multiples and indexing the pin box accordingly.

A still further object is to provide such mechanism for selectively actuating two or more digit stop pins simultaneously from a single key, and indexing the pin box directly by such actuated digit pins.

The invention involves arranging the zero stop pin plungers in a single plane with a coupling between them so as to bring out the depression of either 1, 2 or more stop pins simultaneously. At the same time these same stop pins are used as an integral part of the pin box indexing mechanism. The advantages obtained through such construction include elimination of multiple designs for stop pins plus the fact that less effort is required to depress the zero keys through simplification of the mechanism. Furthermore, the entire pin box may be made smaller because of the elimination of these several parts.

In carrying out the invention according to a preferred embodiment, mechanism is provided for selectively setting single digits or a plurality of the same digit into a calculator register having a plurality of settable stop pins. A single row of stop pins is provided, which pins can be set singly or in groups through the action and cooperation of a plurality of stop pin plungers arranged in a plane. An escapement is also provided which through engagement of a tooth with a rack prevents indexing of the register until such time as the selected stop pins have been set, and which, thereafter, through engagement of a bail with a non-set stop pin enables indexing of the register the required number of steps so that the same stop pins serve both for digit setting and for indexing.

Features and advantages of the invention will be seen from the above, from the following description of operation of the preferred embodiment when considered in conjunction with the drawing and from the appended claims.

For the sake of simplicity and clarity, the invention is shown and will be described as applied to calculating machines equipped with single, double and triple zero keys, it being understood, nevertheless, that the invention is also applicable to other machines arranged for registering digits, and for selectively registering singles or multiples of digits other than zero.

Figure 1:
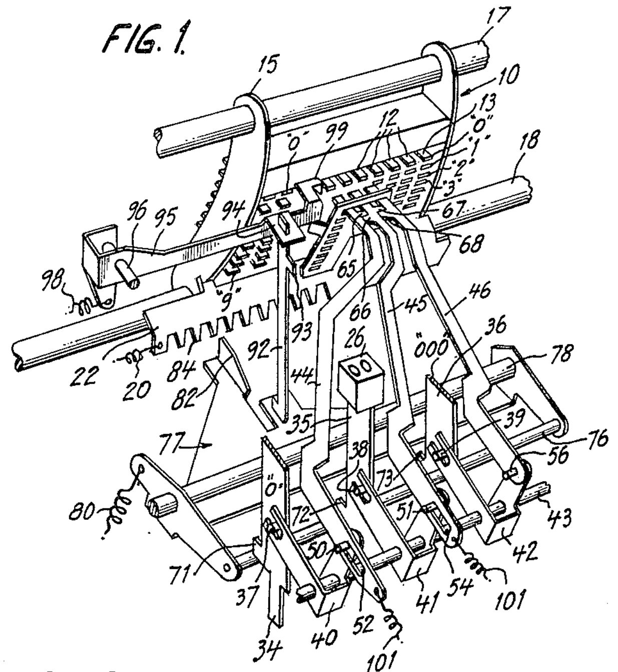
FIG. 1 is a simplified schematic perspective view of a portion of keyboard and registering mechanism of a calculating machine embodying the invention.

Referring to FIG. 1, 10 generally designates a pin box consisting of a plurality of rows 12 of settable stop pins 13. Ten stop pins 13 are provided for each pin row 12, one pin for each of the digits "0" through 9 and are so designated. The rows 12 of settable pins 13 are mounted within a pin box frame 15 supported on rods 17 and 18 for sliding movement along the rods. Pin box 10 is constantly urged to the left under the influence of a biasing spring 20 connected to the left end of a rack 22 formed integral with frame 15 of the pin box. Depression or actuation of a selected settable stop pin 13 registers the digit corresponding to such pin in the pin row 12 of such set pin 13.

For the sake of clarity, only the key mechanism for setting the zero stop pins 13 (the uppermost pin in each of the rows 12 of FIG. 1) has been illustrated. The key mechanism shown is of the three zero type; only the key top 26 for the double zero key "00" being shown. Each zero key is provided with key stem, namely the single zero "0" key (not shown) with stem 34, the double zero "00" key 26 with stem 35 and the triple zero "000"

key (not shown) with stem 36. Each of these stems 34, 35, 36 is provided with a pin 37, 38, 39, respectively, loosely coupled to a bell crank 40, 41, 42, respectively.

These bell cranks 40, 41, 42 are individually pivoted on a rod 43, and each is connected at one end to a corresponding zero pin plunger 44, 45, and 46. For the single zero "0" key (not shown) and the double zero "00" key 26 the pin plungers 44 and 45, respectively, are movably connected with their respective bell cranks 40, 41 by means of pins 50, 51, respectively, protruding from bell cranks 40, 41, into elongated slots 52, 54, respectively, formed in one end of plungers 44, 45. Plungers 44, 45 are maintained in their normally unactuated position (FIG. 1) by means of their respective biasing springs 101. Triple zero plunger 46 is pivotably connected at 56 to bell crank 42.

Single zero pin plunger 44 is provided near its upper end with a laterally extending lug 65 disposed for cooperation with a similar lug 66 protruding from double zero pin plunger 45. Plunger 45 is provided with a second lateral lug 67 disposed for coupling cooperation with a similar lug 68 protruding from triple zero pin plunger 46.

The keys are normally maintained in their raised positions by means of a rocker assembly 77 which is pivotably mounted on a rod 78 and biased by spring 80 counterclockwise. Rocker 77 includes a rod 76 in position to engage the undersides of projections 71, 72 and 73 formed on zero key stems 34, 35 and 36, respectively, to maintain the zero keys in their normally raised positions.

Rocker assembly 77 is also provided with a projecting escapement tooth 82 adapted for engagment with teeth 84 of the pin box indexing rack 22. Spring 80 biases rocker assembly 77 counterclockwise to normally maintain rocker assembly tooth 82 out of engagement with rack teeth 84, as is shown in FIG. 1.

Mounted on rocker 77 is a vertically extending bar 92 having a laterally extending lug 93 near its uppermost end. The upper portion of bar 92 passes through a slotted lug 94 protruding from a bail 95. Bail 95 is pivoted on a rod 96 and is biased by a spring 98 clockwise. Such bias urges a projection 99 formed on the end of bail 95 downward into engagement with the left edge of a zero stop pin 13 (FIG. 5) to prevent leftward movement of pin box 10 under the force of pin box biasing spring 20 (FIG. 1).

Assume that the single zero "0" key (not shown) is actuated in order to register a single zero in pin box 10. Depression of such key causes downward movement of single zero key stem 34. Such movement through pin 37 rotates bell crank 40 counterclockwise. Bell crank 40 by means of its pin 50 drives single zero plunger 44 forward into engagement with zero pin 13 of a first pin row 12. Forward movement of plunger 44 (FIG. 2) actuates zero pin 13 into "set" position, registering a single zero in pin box 10.

Downward movement of key stem 34 of the single zero key also rotates rocker assembly 77 clockwise (through lug 71 in engagement with rod 76 of rocker assembly 77) against the bias of its spring 80. Such clockwise movement of rocker assembly 77 causes upward movement of escapement tooth 82 of rocker assembly 77 into meshing engagement with teeth 84 of indexing rack 22 of pin box 10, thereby locking the pin box against indexing movement to the left.

Simultaneously therewith, clockwise movement of rocker assembly 77 moves vertical bar 92 upward causing lug 93 of the bar to engage lug 94 protruding from bail 95. Such engagement urges bail 95 counterclockwise against the bias of its spring 98, moving bail projection 99 from the position for engaging the zero stop pins 13 to the non-engaging position shown in broken line outline in FIG. 5.

Upon release of the single zero key (not shown), rocker assembly 77 is urged by its biasing spring 80 counterclockwise. Such counterclockwise movement causes rocker assembly bar 76 to engage lug 71 of single zero key stem 34 to restore the single zero key to its normally raised position. Such upward movement of key stem 34 causes its pin 37 to rotate its associated bail 40 clockwise to unactuated position; pin 50 carried by bail 40 moving along elongated slot 52 in single zero plunger 44. Such movement of pin 50 allows plunger 44 to be restored backward to its unactuated condition (FIG. 1) by its biasing spring 101.

Such counterclockwise restoring movement of rocker assembly 77 also moves escapement tooth 82 out of mesh with teeth 84 of pin box rack 22, allowing pin box 10 to be indexed leftward under the biasing force of its spring 20. Simultaneously with disengagement of tooth 82 with rack teeth 84 vertical bar 92 is moved downward by rocker assembly 77, its lug 93 moving out of engagement with lug 94 of bail 95, thereby leaving the bail free to pivot. Under such conditions, bail 95 is urged clockwise by its spring 98 into position to place its pin engaging portion 99 in the path of zero pins 13 carried by pin box 10; the bail position shown in solid line outline in FIG. 5. Pin box 10 is, thus, moved leftward by its biasing spring 20 until pin 13 of the next succeeding pin row 12 comes into engagement with projection 99 (shown in FIG. 3) of bail 95 and limits thereon. Such engagement stops further leftward movement of pin box 10. It is thus seen that pin box 10 is indexed one step to the left by the "setting" of a single zero pin 13.

Figures 2, 3, 4, 5:
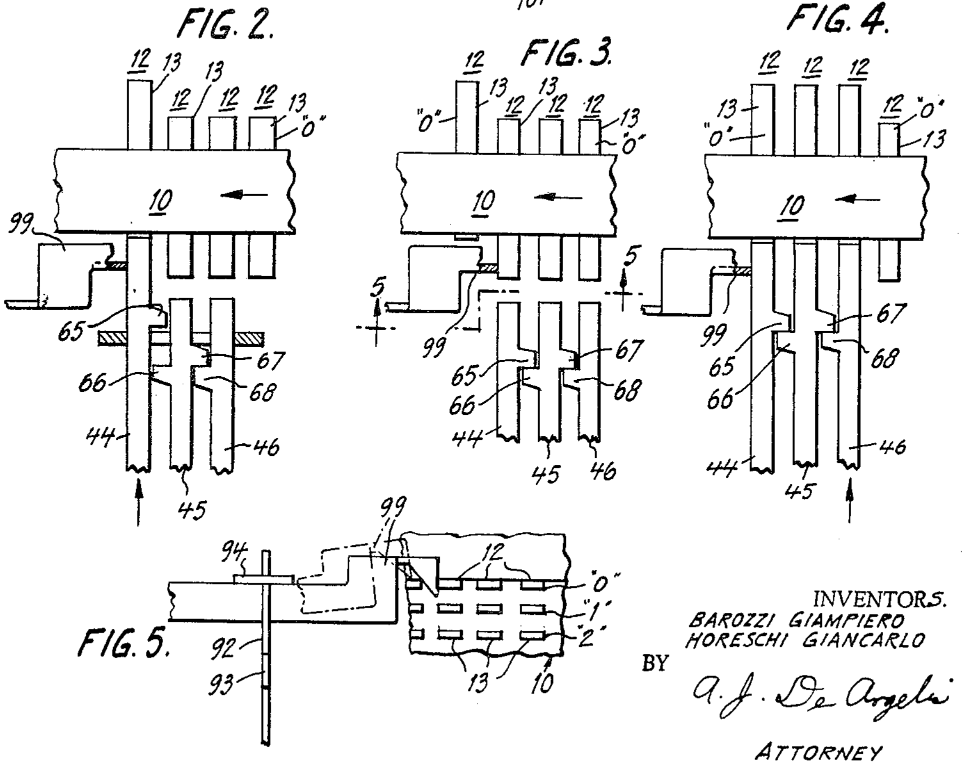
FIG. 2 is a simplified fragmentary plan view of a portion of the mechanism of FIG. 1, showing the zero plungers and zero stop pins in one operated condition.
FIG. 3 is a view similar to that of FIG. 2, showing the pin box escaped one step to the left.
FIG. 4 is another view similar to that of FIG. 2, showing another operated condition of the subject mechanism.
FIG. 5 is a view of the mechanism of FIG. 3 taken along the line 5—5.

The operation of double zero key 26 is similar to that described for the single zero key with the exception that actuation of double zero key 26 with the consequent actuating of its pin plunger 45, as can be seen in FIG. 3, causes coupling engagement of lug 66 carried by plunger 45 with lug 65 carried by single zero plunger 44. Such coupling causes actuation of both plungers and simultaneous "setting" of two adjacent zero pins 13 in pin box 10, thereby registering a double zero. Elongated slot 52 formed in plunger 45 permits such coupled actuation of plunger 44 notwithstanding that its associated bail 40 and key stem 34 remain unactuated.

It may be seen from the foregoing description of the pin box indexing mechanism that the "setting" of two zero pins 13 simultaneously causes pin box 10 to be indexed leftward by its spring 20 two steps, until projection 99 of bail 95 engages a zero stop pin 13 which has not been "set."

Similar action takes place when a triple zero key (not shown) and its associated key stem 36 (FIG. 1) are depressed. Briefly, such depression causes triple zero pin plunger 46 (FIG. 4) to be actuated forward. Such forward movement through coupling lugs 67, 68 and 65, 66 couples single zero plunger 44 and double zero plunger 45 to the triple zero plunger 46 for simultaneous actuation therewith, and, in turn, the consequent simultaneous setting of three zero stop pins 13 in adjacent pin rows 12. As has been previously described, pin box 10 will then be indexed by the indexing mechanism three steps to the left under the influence of its biasing spring 20 (FIG. 1) until projection 99 of bail 95 engages the next succeeding zero stop pin 13 which has not been set.

The subject arrangement, therefore, provides a simple mechanism for the selective registering of a given digit singly or in multiples into the register of a calculating machine. As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. Mechanism for selectively entering digits singly or in groups into a business machine comprising, a pin box having a plurality of stop pins arranged in predetermined rows and being individually settable to register corresponding digits, at least two pin plungers arranged in a common plane and adapted for setting of the said pins brought into alignment with said plungers in said plane, key means, one for each of said plungers for actuating its associated plunger, pin box escapement means for indexing said pin box to bring successive rows of said pins into alignment with said plungers, said escapement means including a bail responsive to actuation of any of said plungers for permitting indexing of said pin box the number of rows corresponding to the number of said pins set, and plunger coupling means for coupling said pin plungers, said coupling means permitting independent actuation of a first one of said plungers by its associated key means and causing coupled actuation of both said plungers under conditions where the other of said plungers is actuated by its associated key means.

2. Mechanism as set forth in claim 1 wherein said bail of said escapement means is disposed in position for engagement with said pins in said plane to stop indexing of said pin box by engagement with a non-set pin causing said pins to serve for both digit registering and pin box indexing.

3. Mechanism for selectively entering digits singly or in groups into a business machine comprising, a pin box having a plurality of stop pins arranged in predetermined rows and being individually settable to register corresponding digits, a plurality of pin plungers arranged in a common plane and adapted for setting of the said pins brought into alignment with said plungers in said plane, a plurality of key means, one for each of said plungers for actuating its plunger, pin box escapement means for indexing said pin box to bring successive rows of said pins into alignment with said plungers, said escapement means including a bail responsive to actuation of any of said plungers for permitting indexing of said pin box the number of rows corresponding to the number of said pins set, and plunger coupling means for selectively coupling said pin plungers for actuation singly or in predetermined groups, said coupling means including motion transmitting mechanism permitting translation of movement from said key means to their respective associated plungers while preventing movement of said plunger being translated to said key means.

4. Mechanism as set forth in claim 3 wherein said motion transmitting mechanism of said coupling means includes a pin formed on said key means disposed loosely in an elongated slot defined in said corresponding pin plunger.

References Cited in the file of this patent

UNITED STATES PATENTS

| | | |
|---|---|---|
| 2,042,909 | Satukangas | June 2, 1936 |
| 2,062,963 | Benninger | Dec. 1, 1936 |
| 3,066,862 | Zimmermann | Dec. 4, 1962 |